(12) United States Patent
Takemura et al.

(10) Patent No.: US 8,207,834 B2
(45) Date of Patent: Jun. 26, 2012

(54) IMAGE PROCESSING DEVICE AND VEHICLE DETECTION DEVICE PROVIDED WITH THE SAME

(75) Inventors: Masayuki Takemura, Hitachi (JP); Shoji Muramatsu, Hitachinaka (JP); Tatsuhiko Monji, Hitachinaka (JP); Yuji Otsuka, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 312 days.

(21) Appl. No.: 12/363,129

(22) Filed: Jan. 30, 2009

(65) Prior Publication Data
US 2009/0195410 A1   Aug. 6, 2009

(30) Foreign Application Priority Data
Feb. 1, 2008 (JP) ................... 2008-022858

(51) Int. Cl.
- B60Q 1/00 (2006.01)
- G08G 1/00 (2006.01)
- G06K 9/00 (2006.01)
- G01S 13/88 (2006.01)

(52) U.S. Cl. ............... 340/425.5; 340/435; 340/904; 382/104; 701/514

(58) Field of Classification Search ........... 340/425.5
See application file for complete search history.

(56) References Cited

U.S. PATENT DOCUMENTS

| | | | |
|---|---|---|---|
| 6,191,704 B1* | 2/2001 | Takenaga et al. | 340/903 |
| 7,253,389 B2* | 8/2007 | Yoshida | 250/208.1 |
| 7,623,681 B2* | 11/2009 | Miyahara | 382/104 |
| 2006/0140449 A1 | 6/2006 | Otsuka | |
| 2008/0239078 A1* | 10/2008 | Mohr et al. | 348/148 |
| 2009/0303077 A1* | 12/2009 | Onome et al. | 340/901 |

FOREIGN PATENT DOCUMENTS

| | | |
|---|---|---|
| JP | 5-108149 A | 4/1993 |
| JP | 2002-104113 A | 4/2002 |
| JP | 2006-178652 A | 7/2006 |
| JP | 2006-182086 A | 7/2006 |

* cited by examiner

Primary Examiner — Jennifer Mehmood
Assistant Examiner — John Mortell
(74) Attorney, Agent, or Firm — Crowell & Moring LLP

(57) ABSTRACT

A virtual vehicle which approaches to a monitor-side vehicle and a virtual background are defined in a camera image, and a region in which a virtual vehicle moves fast with respect to a virtual background is defined as a first region F1, and a region in which a virtual vehicle moves slowly with respect to a virtual background is defined as a second region F2. Then, the first region F1 and the second region F2 combined with an actual camera image. In the first region F1, in which the virtual vehicle moves fast, a monitored vehicle is detected by a movement aspect of feature portions in the region, and in the second region F2, in which the virtual vehicle moves slowly, a monitored vehicle is detected by pattern recognition.

8 Claims, 9 Drawing Sheets

Cm: Position of own vehicle in map coordinates system
Am: Position of monitored vehicle in map coordinates system
Bm: Position of background in map coordinates system (a) Own vehicle coordinates system (b) Camera coordinates system Cm: Position of own vehicle in map coordinates system
Am: Position of monitored vehicle in map coordinates system
Bm: Position of background in map coordinates system (a) In case of own vehicle traveling straight and straight rear area (b) In case of own vehicle traveling straight or in curve, and curved rear area

IMAGE PROCESSING DEVICE AND VEHICLE DETECTION DEVICE PROVIDED WITH THE SAME

BACKGROUND OF THE INVENTION

1. Field of the Invention

The present invention relates to an image processing device for analyzing a surrounding image around a monitor-side vehicle obtained by an in-vehicle camera and detecting a presence of a vehicle around the monitor-side vehicle, and a vehicle detection device provided therewith.

2. Background Art

Examples of a technique for analyzing a surrounding image of a monitor-side vehicle obtained by an in-vehicle camera to detect a presence of a vehicle around a monitor-side vehicle include techniques described in JP Patent Publication (Kokai) No. 2002-104113A and JP Patent Publication (Kokai) No. 2006-182086A below.

The technique described in JP Patent Publication (Kokai) No. 2002-104113A uses the optical flow technique for detecting a movement of a feature point in an image, and detects a moving object (a vehicle) from a difference in movement in an image between a background and the moving object.

The technique described in JP Patent Publication (Kokai) No. 2006-182086A detects a vehicle according to whether a shape pattern analogous to any of a plurality of previously stored shape patterns exists in an image or not.

SUMMARY OF THE INVENTION

However, in the technique described in JP Patent Publication (Kokai) No. 2002-104113A, in the case of imaging a rear area of the monitor-side vehicle by a camera, there is a problem that a monitored vehicle traveling in the far distance in the rear area of the monitor-side vehicle may fail to be detected due to a small difference in movement between a background and this monitored vehicle.

In the technique described in JP Patent Publication (Kokai) No. 2006-182086A, storing a plurality of shape patterns of front shapes of various vehicles, there is a problem that a monitored vehicle may fail to be detected if images obtained by a camera include an image of this monitored vehicle captured in a diagonal or a lateral direction.

The present invention focuses on the problems of the conventional art, and an object of the preset invention is to provide an image processing device which is capable of minimizing the detection failure of monitored vehicles around the monitor-side vehicle, and a vehicle detection device provided with the image processing device.

To solve the problems, in the present invention, in a virtual camera image, a virtual vehicle and a virtual background which exist around the monitor-side vehicle are defined, and a region in which a virtual vehicle moves fast with respect to a virtual background is defined as a first region, and a region in which a virtual vehicle moves slowly with respect to a virtual background is defined as a second region. Then, the first region and the second region are applied to an actual camera image. In the first region in which a virtual vehicle moves fast, a monitored vehicle is detected from a movement aspect of feature portions, and in the second region in which a virtual vehicle moves slowly, a monitored vehicle is detected by pattern recognition.

In particular, in defining the first region and the second region, there are provided a virtual background in a common image present at both a vehicle detection time and a predetermined time-period earlier time than the vehicle detection time, and a virtual vehicle moving in a predetermined speed in the common image present at both the times. Then, a difference is obtained between a movement of the virtual background in the image from the predetermined time-period earlier time to the vehicle detection time and a movement of the virtual vehicle in the image from the predetermined time-period earlier time to the vehicle detection time, and then for the image at the vehicle detection time, a first region for which the difference is equal to or larger than a predetermined value is defined, and a second region for which the difference is less than the predetermined value is defined.

According to the present invention, in an image obtained by an in-vehicle camera, a first region in which a monitored vehicle moves fast with respect to a background and a second region in which a monitored vehicle moves slowly with respect to a background are defined. In the first region, a monitored vehicle is detected from movement of feature portions in the region, and in the second region, a monitored vehicle is detected by pattern recognition, thereby minimizing detection failure of a monitored vehicle.

DESCRIPTION OF SYMBOLS

1: camera, 2: radar device, 3: speaker, 4: travel control device, 5: vehicle speed sensor, 10: image processing device, 12: storage device, 13: shape pattern, 14: vehicle detection program, 20: CPU, 21: region defining unit, 22: region extracting unit, 23: first image processing unit, 24: second image processing unit, 25: approaching vehicle determining unit, 26: output unit, 30: car navigation device

DETAILED DESCRIPTION OF THE PREFERRED EMBODIMENTS

Hereinbelow, one embodiment of a vehicle detection device according to the present invention will be described with reference to drawings.

Figure 1:
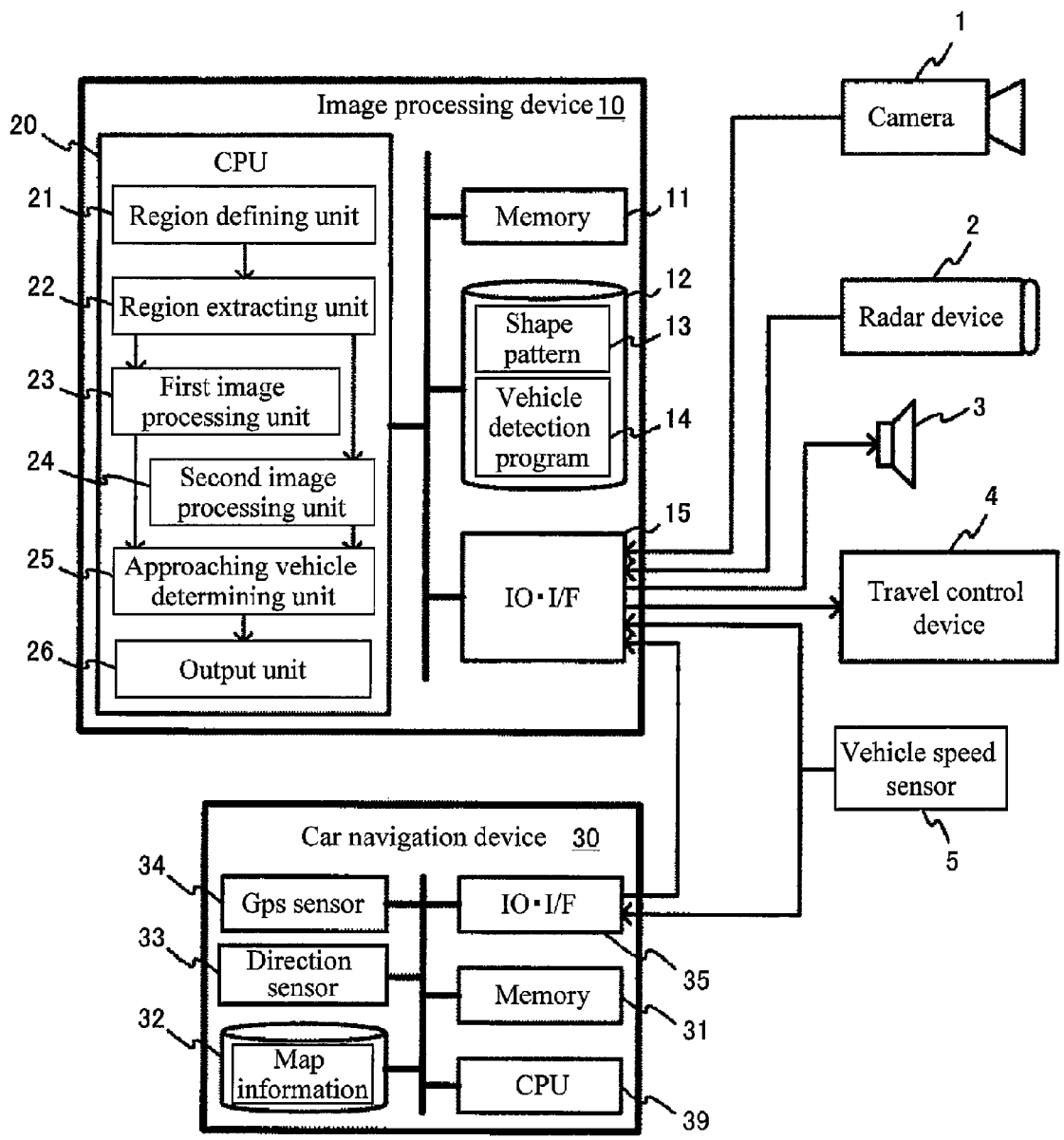
FIG. 1 is a diagram illustrating a configuration of a vehicle detection device of one embodiment according to the present invention.

A vehicle according to the embodiment, as shown in FIG. 1, comprises a camera 1 for imaging a rear area of the vehicle, a radar device 2 for detecting a vehicle and the like in the rear area of the vehicle, a speaker 3 provided in a room of the vehicle, a travel control device 4 for controlling travel of the vehicle, a vehicle speed sensor 5 for detecting a speed of the vehicle, an image processing device 10 for analyzing images obtained by the camera 1, and a car navigation device 30. The vehicle detection device according to the embodiment includes the camera 1 and the image processing device 10.

The image processing device 10 is a computer, and comprises a CPU 20 for performing various processing, a memory 11 which is a work area of the CPU 20, a storage device 12 such as a hard disk drive, and an input-output interface 15 for sending/receiving data and the like to/from outside.

In the storage device 12, a plurality of vehicle patterns 13 which represent front shapes of various vehicles, and a vehicle detection program 14 are stored.

The CPU 20 includes as its functions, a region defining unit 21 for defining a first region and a second region described below in an image from the camera 1, a region extracting unit 22 for extracting an image of the first region and an image of the second region from the image from the camera 1, a first image processing unit 23 for analyzing the image of the first region to detect a presence of a vehicle, a second image processing unit 24 for analyzing the image of the second region to detect a presence of a vehicle, an approaching vehicle determining unit 25 for finally determining a presence of an approaching vehicle based on detection results by the first image processing unit 23 and the second image processing unit 24 as well as a detection result by the radar device 2, and an output unit 26 for outputting the determination result by the approaching vehicle determining unit 25 to the speaker 3 or the travel control device 4. Each of these function units' 21-26 functions by the CPU 20 executing the vehicle detection program 14 stored in the storage device 12.

The car navigation device 30 comprises a CPU 39 for performing various computing, a memory 31 which is a work area of the CPU 39, a storage device 32 in which map information, a car navigation program or the like is stored, a direction sensor 33, a GPS sensor 34, and an input-output interface 35 for sending/receiving data and the like to/from outside.

The travel control device 4 is a computer, and controls a brake system of the vehicle as well as an engine system of the vehicle. In other words, the travel control device 4 is a computer for controlling increase and decrease of the vehicle speed.

Figure 3:
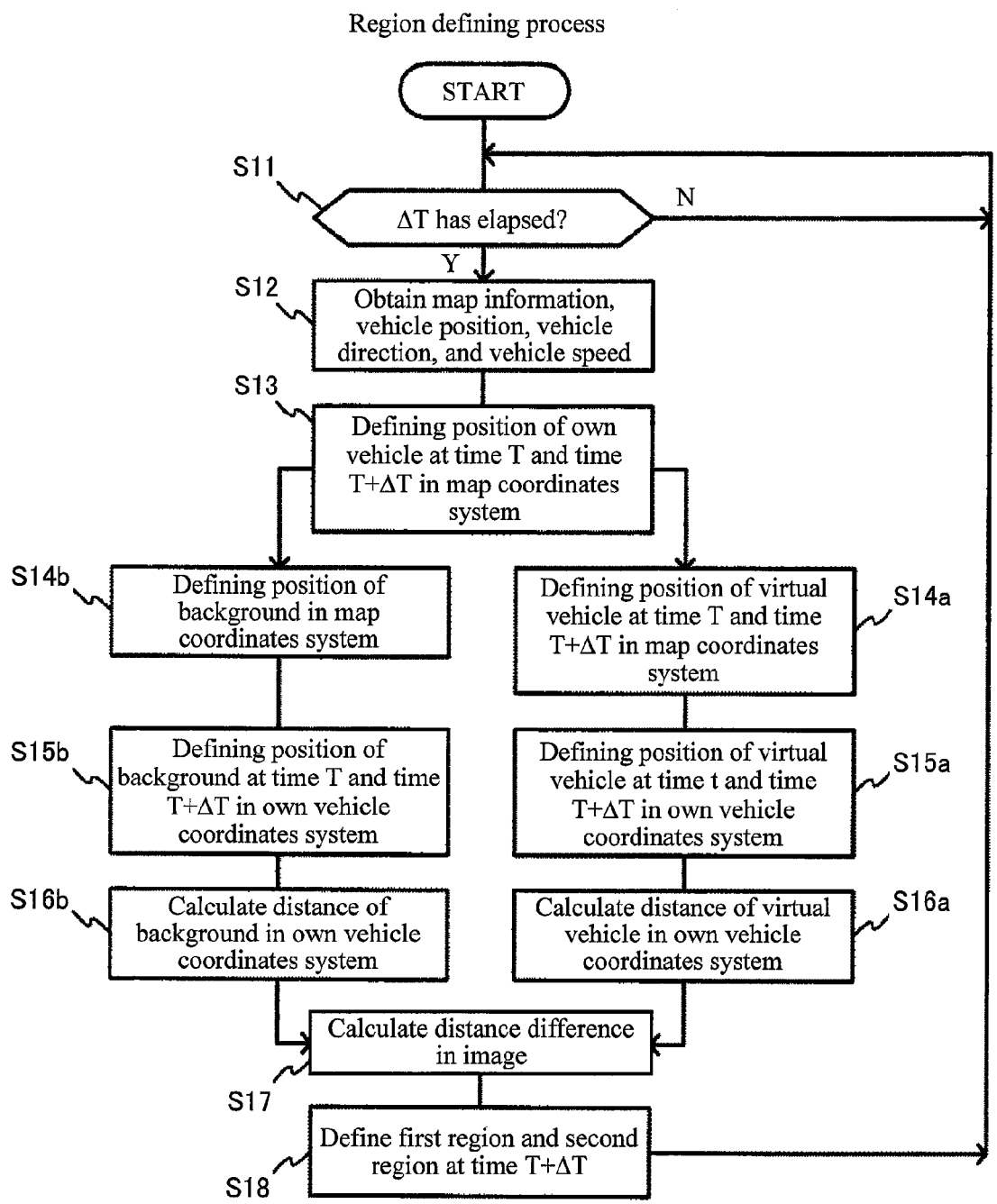
FIG. 3 is a flowchart showing the detail of Step 20 in the flowchart of FIG. 2.
Figure 4:
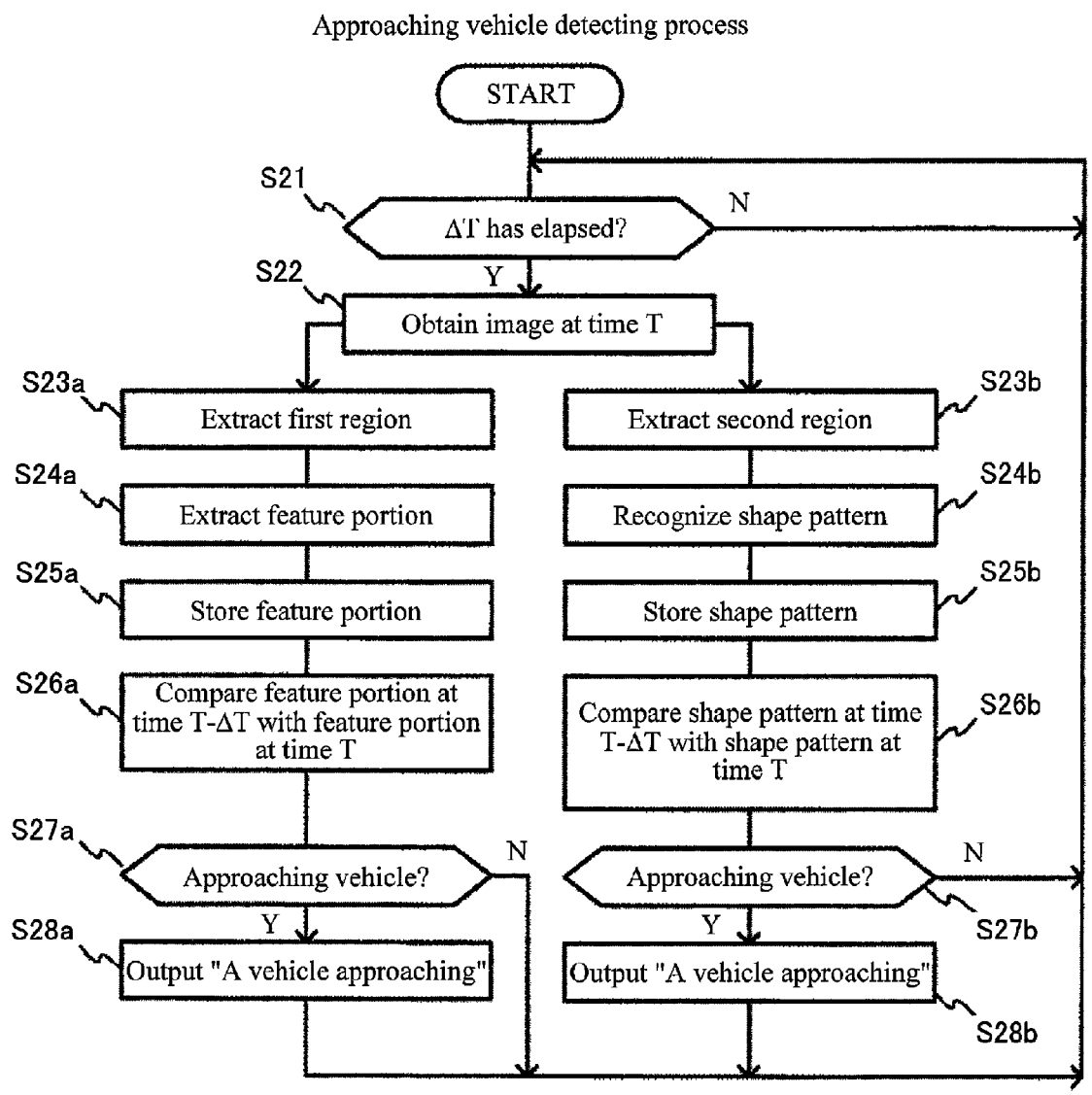
FIG. 4 is a flowchart showing the detail of Step 30 in the flowchart of FIG. 2.

Now, operations of the image processing device 10 according to the embodiment will be described according to the flowcharts shown in FIGS. 2-4.

Figure 2:
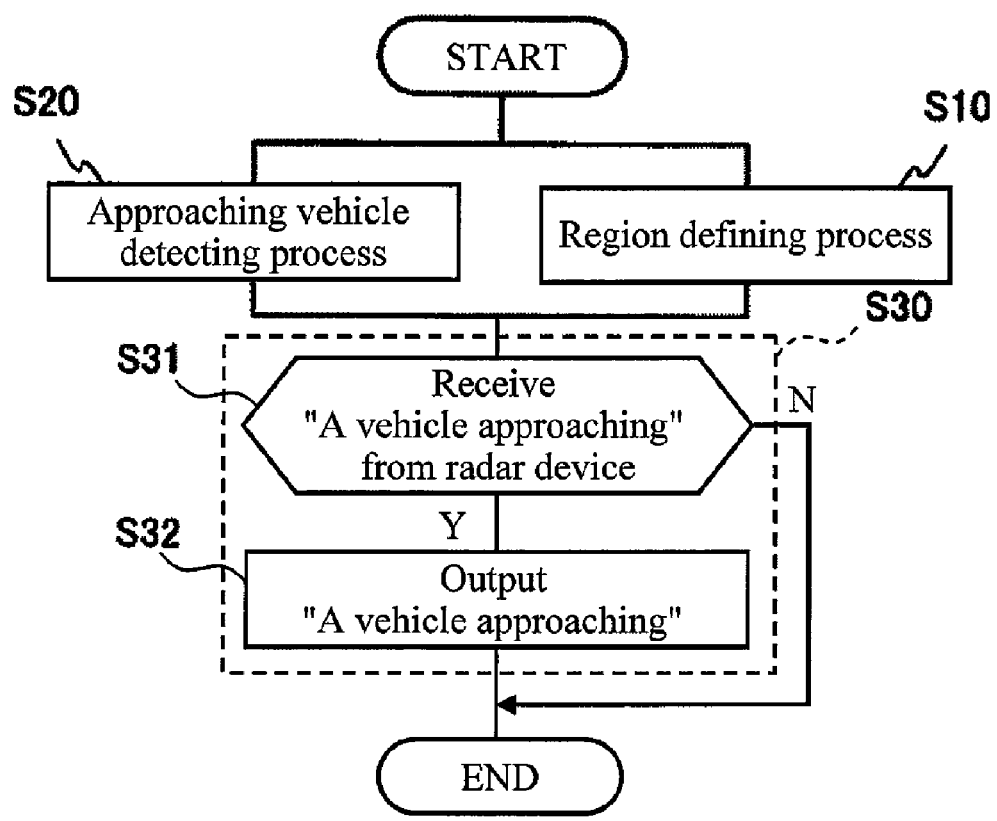
FIG. 2 is a flowchart showing operations of an image processing device of one embodiment according to the present invention.

The region defining unit 21 of the image processing device 10, as shown in the flowchart of FIG. 2, defines the first region and the second region (described below) for an image from the camera 1 (S10). In parallel with this process or after this process, the region extracting unit 22, the first image processing unit 23, and the second image processing unit 24 analyze the image from the camera to detect a presence of an approaching vehicle (S20).

Then, the approaching vehicle determining unit 25 performs the final determining process (S30) for an approaching vehicle. In the determining process (S30), when the first image processing unit 23 or the second image processing unit 24 detects an approaching vehicle, the approaching vehicle determining unit 25 determines whether a notification of "A vehicle approaching" has been received from the radar device 2 in a predetermined time (S31). If an approaching vehicle is detected by the first image processing unit 23 or the second image processing unit 24 and if a notification of "A vehicle approaching" has been received from the radar device 2 in a predetermined time, the output unit 26 outputs, to the travel control device 4 or the speaker 3, a notification that a vehicle is approaching (S32).

When receiving the notification, the travel control device 4, for example, increases the vehicle speed to avoid a risk of a crash with an approaching vehicle from the rear. In addition, the speaker 3 outputs an audible alert or a notification of "A vehicle approaching from the rear" to attract an attention of a driver.

In this step, if an approaching vehicle is detected by the first image processing unit 23 or the second image processing unit 24 and if a notification of "A vehicle approaching" has been received from the radar device 2 in a predetermined time, a notification that a vehicle is approaching is output to the travel control device 4 and the speaker 3. Furthermore, if an approaching vehicle is detected by the first image processing unit 23 or the second image processing unit 24 and if a notification of "A vehicle approaching" has not been received from the radar device 2 in a predetermined time, or on the contrary, if an approaching vehicle is not detected by the first image processing unit 23 or the second image processing unit 24 and if a notification of "A vehicle approaching" has been received from the radar device 2 in a predetermined time, the notification may be output only to the speaker 3.

In addition, other than the travel control device 4 or the speaker 3 described above, an in-vehicle monitor or the like is applicable as an output of the output unit 26.

Now, the region defining process (S10) by the region defining unit 21 will be described in detail according to the flowchart of FIG. 3.

The region defining unit 21 determines whether a predetermined time period $\Delta T$ has elapsed from the start of the operation or not, or whether another time period $\Delta T$ has elapsed after a preceding elapsed time of time period $\Delta T$ or not (S11). A time period $\Delta T$ here is, for example, a time period of the order of $\frac{1}{15}$ second.

The region defining unit 21, if a time period $\Delta T$ has elapsed, obtains a current position of the monitor-side vehicle, map information around the monitor-side vehicle, and a traveling direction of the monitor-side vehicle from the car navigation device 30, as well as a vehicle speed from the vehicle speed sensor 5 (S12). The map information around the monitor-side vehicle is not necessary to be obtained every $\Delta T$ time period. It is preferable to use previously obtained map information if it is available.

Figure 6:
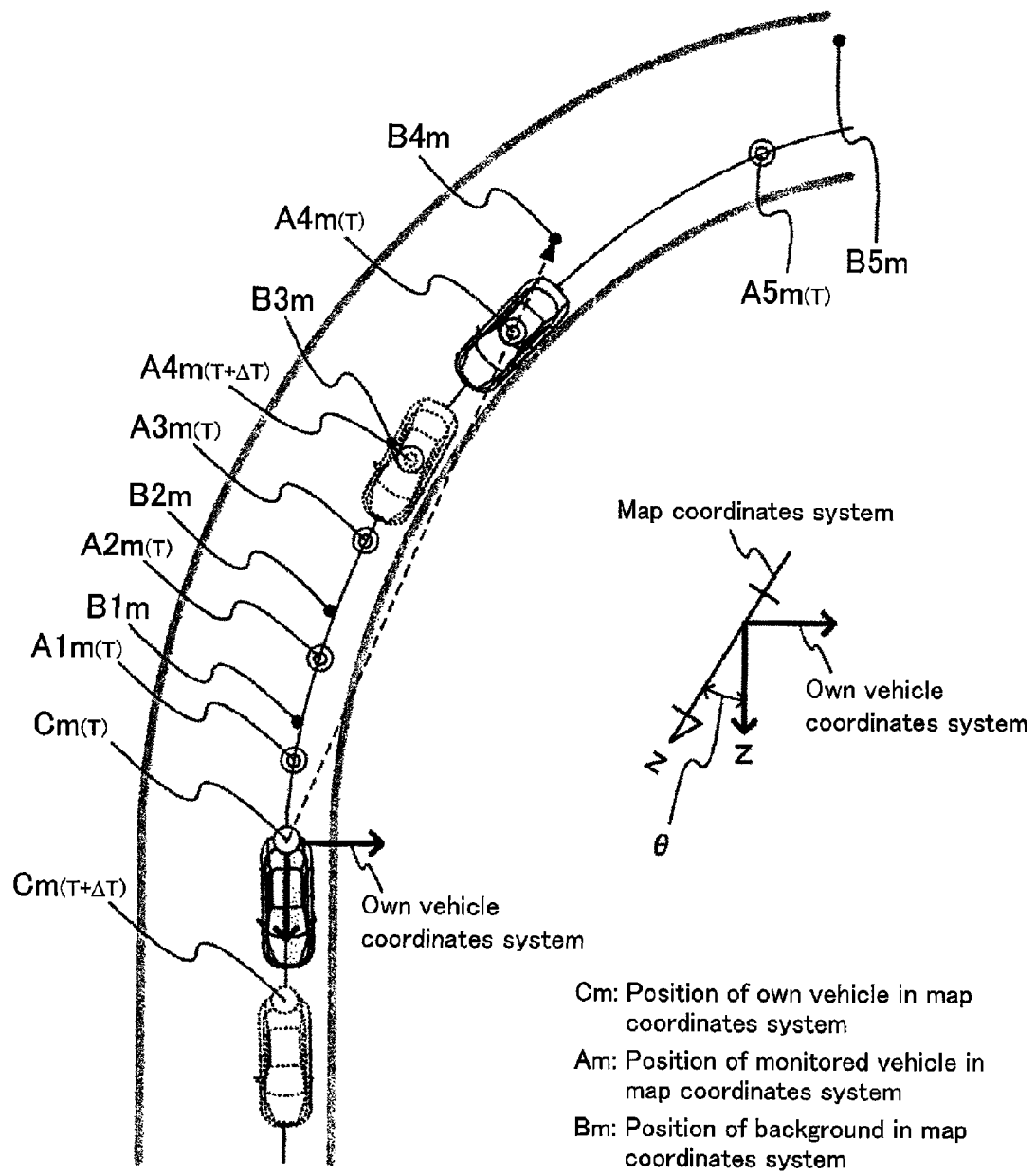
FIG. 6 is a diagram illustrating of definitions of a virtual vehicle and a virtual background with respect to a monitor-side vehicle in one embodiment according to the present invention.

The region defining unit 21 then specifies positions of the monitor-side vehicle at time T and time T+$\Delta T$ on the map obtained in Step 12, as shown in FIG. 6 (S13). In FIG. 6, Cm(T) indicates a position of the monitor-side vehicle at time T in the map coordinates system, and Cm(T+$\Delta T$) indicates a position of the monitor-side vehicle at time T+$\Delta T$ in a map coordinates system. A time of T here may be a current time, or may be a time after a predetermined small amount of time from a current time. The region defining unit 21 defines positions of the monitor-side vehicle at time T and time T+$\Delta T$, assuming that a current traveling condition continues from the current vehicle position.

The region defining unit 21 then defines a plurality of virtual vehicles at time T at positions on a road in road information on the map, as shown in FIG. 6, as well as virtual vehicles, after ΔT time period respectively, i.e. virtual vehicles at time T+ΔT with respect to the respective virtual vehicles (S14a). In FIG. 6, A1m(T), A2m(T), A3m(T), A4m(T), and A5m(T) indicate a position of respective virtual vehicles at time T. As a representation of a position of respective virtual vehicles at time T+ΔT, only a position after ΔT time period for the virtual vehicle A4m(T) at time T is shown as A4m(T+ΔT).

The region defining unit 21 defines a plurality of virtual vehicles at time T on a road on the map according to a predetermined rule. The predetermined rule includes the followings: 1) a virtual vehicle should be in an area imaged by the camera 1 at both times of T and T+ΔT; 2) a virtual vehicle should be at a position along a road in the rear area of the monitor-side vehicle; and 3) the farther a virtual vehicle is from the monitor-side vehicle, the larger a distance therebetween is. The region defining unit 21 defines positions of virtual vehicles after ΔT time period, assuming that a speed of respective virtual vehicles is a speed increased by a certain amount from a vehicle speed of the monitor-side vehicle, or is a speed increased by a certain ratio from a vehicle speed of the monitor-side vehicle.

The region defining unit 21 calculates positions of respective virtual vehicles at time T and time T+ΔT in a monitor-side vehicle coordinates system. In other words, a position of respective virtual vehicles in the map coordinates system defined in Step 14a is transformed into the monitor-side vehicle coordinates system (S15a).

Figure 5:
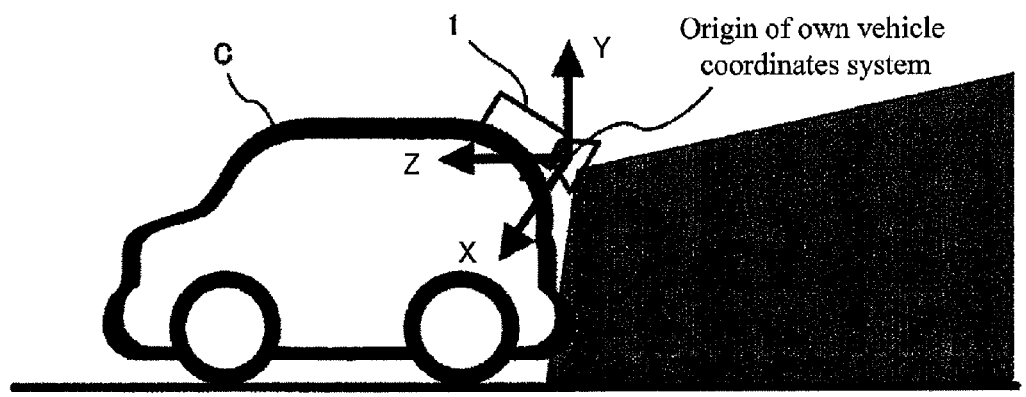
FIG. 5 is a diagram illustrating a monitor-side vehicle coordinates system (FIG. 5(a)) and a camera coordinates system (FIG. 5(b)) of one embodiment according to the present invention.
Figure 5:
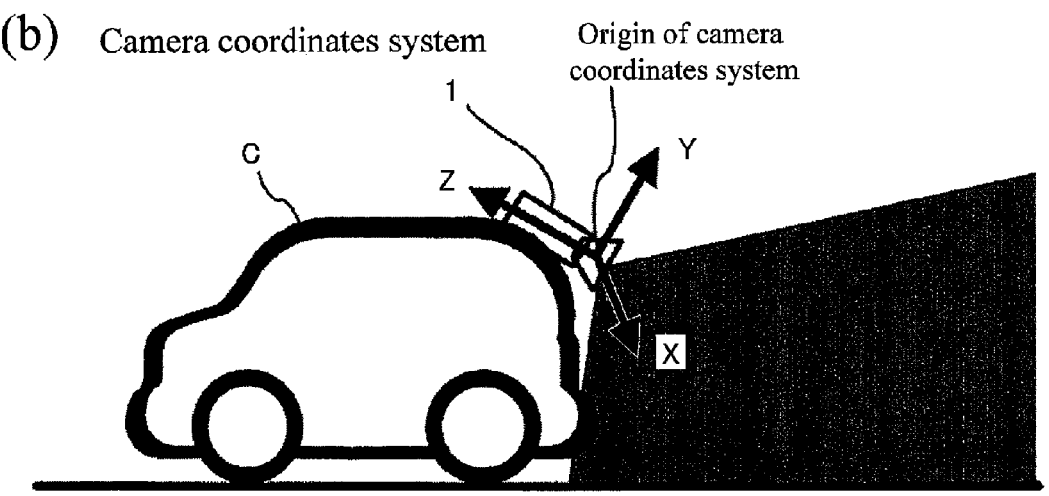

Now, the monitor-side vehicle coordinates system and a camera coordinates system will be described with reference to FIG. 5.

The monitor-side vehicle coordinates system is a right-handed coordinates system where the origin is at the center of a lens of the camera 1 placed in the rear of a monitor-side vehicle C, the y-axis goes vertically upward, the z-axis goes to a vehicle traveling direction, and the x-axis goes to a direction at a right angle to the y-axis and the z-axis, as shown in FIG. 5(a). As described above, due to the origin of the monitor-side vehicle coordinates system being at the center of the lens of the camera 1 placed in the rear of the monitor-side vehicle C, the positions of the monitor-side vehicle, Cm(T) and Cm(T+ΔT), in the map coordinates system defined in Step 13 are at the center position of the lens of the camera 1 placed in the rear of the monitor-side vehicle C.

The camera coordinates system is a right-handed coordinates system where the origin is at the center of a lens of the camera 1, the z-axis is a lens optical axis of the camera 1, the y-axis goes to a direction at a right angle to the z-axis in a plane which expands vertically, and the x-axis goes to a direction at a right angle to the y-axis and the z-axis, as shown in FIG. 5(b).

As a map generally defines an axis in the north direction, the map coordinates system according to the embodiment is a right-handed coordinates system where the z-axis goes to the north direction, the y-axis goes vertically upward, and the x-axis goes to a direction at a right angle to the y-axis and the z-axis, as shown in FIG. 6.

Now, how to transform a position of a virtual vehicle in the map coordinates system into the monitor-side vehicle coordinates system described above will be described.

Here, a three dimensional position of the monitor-side vehicle in the map coordinates system at time T is represented as Cm(T), and a three dimensional position of a virtual vehicle in the map coordinates system at time T is represented as Am(T). A coordinate value of Cm(T), Am(T), respectively represented in a homogeneous coordinates system form, will be the following.

$$Cm(T)=(Cm(T)x,Cm(T)y,Cm(T)z,1)$$

$$Am(T)=(Am(T)x,Am(T)y,Am(T)z,1)$$

An angle of the z-axis in the monitor-side vehicle coordinates system with respect to the z-axis in the map coordinates system at time T is represented as θ(T). In this case, a rotation matrix formula R(T) for rotationally transforming a road coordinates system into the monitor-side vehicle coordinates system will be following:

$$R(T) = \begin{bmatrix} \cos_{\theta_T} & 0 & \sin_{\theta_T} & 0 \\ 0 & 1 & 0 & 0 \\ \sin_{\theta_T} & 0 & \cos_{\theta_T} & 0 \\ 0 & 0 & 0 & 1 \end{bmatrix} \quad \text{(Equation 1)}$$

To transform a three dimensional position Am(T) of a virtual vehicle in the map coordinates system into a three dimensional position Ac(T) in the monitor-side vehicle coordinates system, as shown in Equation 2 below, a three dimensional position Cm(T) of the monitor-side vehicle is subtracted from a three dimensional position Am(T) of a virtual vehicle, and the result is multiplied by the rotation matrix formula R(T).

$$Ac(T)=R(T)(Am(T)-Cm(T) \quad \text{(Equation 2)}$$

In addition, in the case of transforming a three dimensional position Am(T+ΔT) of a virtual vehicle in the map coordinates system into a three dimensional position Ac(T+ΔT) in the monitor-side vehicle coordinates system, as shown in Equation 3 below, a similar equation to the above may be used for transformation.

$$Ac(T+\Delta T)=R(T+\Delta T)(Am(T+\Delta T)-Cm(T+\Delta T)) \quad \text{(Equation 3)}$$

For the sake of simplicity, an angle θ(T+ΔT) of the z-axis in the monitor-side vehicle coordinates system with respect to the z-axis in the map coordinates system at time T+ΔT here will be same as the value of θ(T).

The region defining unit 21 then uses Equation (4) below to obtain a distance MAc of a virtual vehicle from time T to time T+ΔT in the monitor-side vehicle coordinates system (S16b).

$$MAc=Ac(T+\Delta T)-Ac(T) \quad \text{(Equation 4)}$$

A distance MAc of a virtual vehicle here is, not a scalar quantity, but a vector quantity in the monitor-side vehicle coordinates system.

Each of the above-described processes in Step 15a and Step 16a is performed for all of the virtual vehicles defined in Step 14a.

The region defining unit 21 performs Steps 14b-16b described below, in parallel with Steps 14a-16a above, or after Steps 14a-16a.

Figure 7:
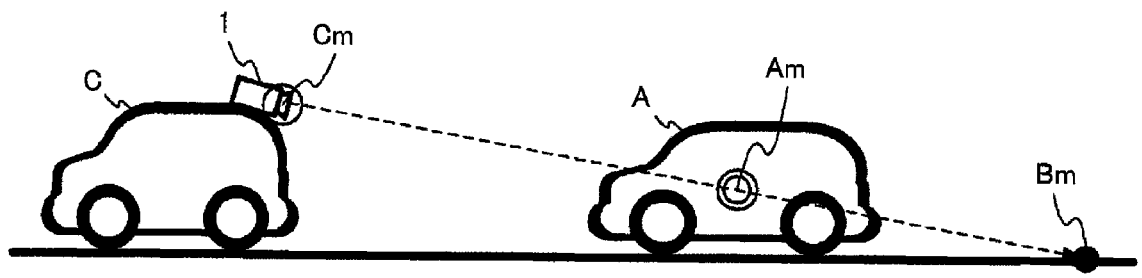
FIG. 7 is a diagram illustrating a relation between a virtual vehicle and a virtual background in one embodiment according to the present invention.

The region defining unit 21, as shown in FIG. 6, defines a plurality of virtual backgrounds B1m, B2m, B3m, B4m, B5m, etc. on a road on the map according to a predetermined rule (S14b). The predetermined rule includes the followings: 1) a virtual background should be in an area imaged by the camera 1 at both times of T and T+ΔT; and 2) as shown in FIG. 7, a virtual background is in the rear area of a virtual vehicle Am at time T and is at the same position of the virtual vehicle Am in an image.

The region defining unit 21 then calculates positions of respective virtual backgrounds at time T and time T+ΔT in the monitor-side vehicle coordinates system. In other words, a position of respective virtual backgrounds in the map coordinates system defined in Step 14b is transformed into the monitor-side vehicle coordinates system (S15b)

Now, how to transform a position of a virtual background in the map coordinates system into the monitor-side vehicle coordinates system will be described. This transform operation is also basically similar to the transform operation in the Step 15a described above.

Here, a three dimensional position of the monitor-side vehicle in the map coordinates system at time T is represented as Cm(T), a three dimensional position of the monitor-side vehicle in the map coordinates system at time T+ΔT is represented as Cm(T+ΔT), and a three dimensional position of a virtual background in the map coordinates system is represented as Bm. A coordinate value of Cm(T), Cm(T+ΔT), Bm, respectively represented in a homogeneous coordinates system form, will be the following.

$$Cm(T)=(Cm(T)x,Cm(T)y,Cm(T)z,1)$$

$$Cm(T+\Delta T)=(Cm(T+\Delta T)x,Cm(T+\Delta T)y,Cm(T+\Delta T)z,1)$$

$$Bm=(Bmx,Bmy,Bmz,1)$$

In the case of transforming a three dimensional position Bm of a virtual background in the map coordinates system into a three dimensional position Bc(T) in the monitor-side vehicle coordinates system at time T, Equation 5 below may be used for transformation.

$$Bc(T)=R(T)(Bm-Cm(T)) \quad \text{(Equation 5)}$$

In addition, in the case of transforming a three dimensional position Bm of a virtual background in the map coordinates system into a three dimensional position Bc(T+ΔT) in the monitor-side vehicle coordinates system at time T+ΔT, Equation 6 below may be used for transformation.

$$Bc(T+\Delta T)=R(T+\Delta T)(Bm-Cm(T+\Delta T)) \quad \text{(Equation 6)}$$

The region defining unit 21 then uses Equation (7) below to obtain a distance MBc of a virtual background Bm from time T to time T+ΔT in the monitor-side vehicle coordinates system (S16a).

$$MBc=Bc(T+\Delta T)-Bc(T) \quad \text{(Equation 7)}$$

A distance MBc of a virtual background is, not a scalar quantity, but a vector quantity in the monitor-side vehicle coordinates system.

Each of the above-described processes in Step 15b and Step 16b is performed for all of the virtual backgrounds defined in Step 14b.

The region defining unit 21 then obtains a distance difference in a virtual camera image between the distance MAc of the virtual vehicle obtained in Step 16a and the distance MBc of the virtual background obtained in Step 16b (S17).

To obtain a distance difference in an image between the distance MAc of the virtual vehicle in the monitor-side vehicle coordinates system and the distance MBc of the virtual background in the monitor-side vehicle coordinates system, a coordinate value in the monitor-side vehicle coordinates system requires to be transformed into a coordinates system on a camera image.

A coordinate value in the coordinates system on a camera image includes a value of X, Y component in the above-described camera coordinates system. In other words, the coordinates system on an image is a camera coordinates system where a Z component is omitted.

Here, a coordinate value of the coordinates system on an image is represented as $(u, v, 1)^T$, and a coordinate value of the monitor-side vehicle coordinates system is represented as $(X, Y, Z, 1)^T$. These coordinate values are also represented in the homogeneous coordinate format. T here represents a transposed matrix.

Equation 8 shown below may be used to transform a coordinate value $(X, Y, Z, 1)^T$ in the monitor-side vehicle coordinates system into the coordinates system on an image.

$$s\begin{bmatrix}u\\v\\1\end{bmatrix} = \begin{bmatrix}p_{11} & p_{12} & p_{13} & 0\\p_{21} & p_{22} & p_{23} & 0\\p_{31} & p_{32} & p_{33} & 0\end{bmatrix}\begin{bmatrix}X\\Y\\Z\\1\end{bmatrix} \quad \text{(Equation 8)}$$

As described above, in the camera coordinates system and the monitor-side vehicle coordinates system, the origin is at the center of a lens of the camera 1. Therefore, a transformation from the monitor-side vehicle coordinates system into the camera coordinates system includes only a transformation by rotational transfer, not a transformation by parallel transfer. Hence, all values in the fourth column of the projection matrix for transformation shown in Equation 8 will be 0. A value of respective components p11, p12 . . . , p33 in the projection matrix is defined when the camera 1 is fixed to the monitor-side vehicle C, and therefore, a fixture for the camera 1 should be used to precisely fix the camera 1 for the monitor-side vehicle C in a predetermined position and in a predetermined direction.

Equation 8 above is expanded to obtain Equation 9 below.

$$\begin{cases}su = p_{11}X + p_{12}Y + p_{13}Z\\sv = p_{21}X + p_{22}Y + p_{23}Z\\s = p_{31}X + p_{32}Y + p_{33}Z\end{cases} \quad \text{(Equation 9)}$$

Equations of u and v are derived from Equation 9 and the scalar s is canceled, leading to Equation 10 below.

$$\begin{cases}u = p_{11}X + p_{12}Y + p_{13}Z/(p_{31}X + p_{32}Y + p_{33}Z)\\v = p_{21}X + p_{22}Y + p_{23}Z/(p_{31}X + p_{32}Y + p_{33}Z)\end{cases} \quad \text{(Equation 10)}$$

Equation 10 may be used to transform a coordinate value (X, Y, Z) in the monitor-side vehicle coordinates system into a coordinate value (u, v) in the coordinates system on a camera image.

A distance MAc (a vector quantity in the monitor-side vehicle coordinates system) of a virtual vehicle shown in Equation 4, and a distance MBc (a vector quantity in the monitor-side vehicle coordinates system) of a virtual background shown in Equation 7 are respectively transformed into a distance MAi of the virtual vehicle in the coordinates system on a camera image, and a distance MBi of the virtual background in the coordinates system on a camera image using Equation 10. As shown in Equation 11 below, by obtaining a difference between both the transformed values, a distance difference in a camera image can be obtained between the distance MAc of the virtual vehicle obtained in Step 16a and the distance MBc of the virtual background obtained in Step 16b (S17).

$$Di = MBi - MAi \quad \text{(Equation 11)}$$
$$= (u_B, v_B) - (u_A, v_A)$$

This process in Step 17 is performed for each of a plurality of virtual backgrounds.

The region defining unit 21 then defines a first region and a second region in a virtual camera image at time T+ΔT (S18).

The region defining unit 21 first connects points at which a distance difference Di of each of a plurality of virtual backgrounds is a predetermined value THR, in the virtual camera image at time T+ΔT to divide this virtual camera image into a first region where a distance difference Di is the predetermined value THR or more, and a second region where a distance difference Di is less than the predetermined value THR. That is, the virtual camera image is divided into the first region in which a monitored vehicle moves fast with respect to a background, and the second region in which a further vehicle moves slowly with respect to a background. This predetermined value THR is a value defined with consideration for error components added to movement on an image. Error components include, for example, shaking of the monitor-side vehicle, errors of data from various sensors and the car navigation device 30, and the like. If the predetermined value THR, which is a threshold, is set low with no consideration for these error components, the second region becomes small and therefore a portion of the second region to be essentially subjected to an image processing of pattern recognition described below fails to be subjected to the image processing described below. This causes a low rate of recognition of monitored vehicles by means of pattern recognition. That is why the embodiment uses the predetermined value THR defined with consideration for error components added to movement on an image.

The region defining unit 21 then expands the first region slightly, as well as expands the second region slightly, forming an overlap area of a width of one vehicle or more between both regions. The region defining unit 21 stores position information of the final first and second regions.

The region defining unit 21, when the process of Step 18 terminates, returns back to Step 11.

That is, the region defining unit 21 defines a first region and a second region for a virtual camera image every ΔT time period.

At this step, the region defining process (S10) will be completed.

Figure 8:
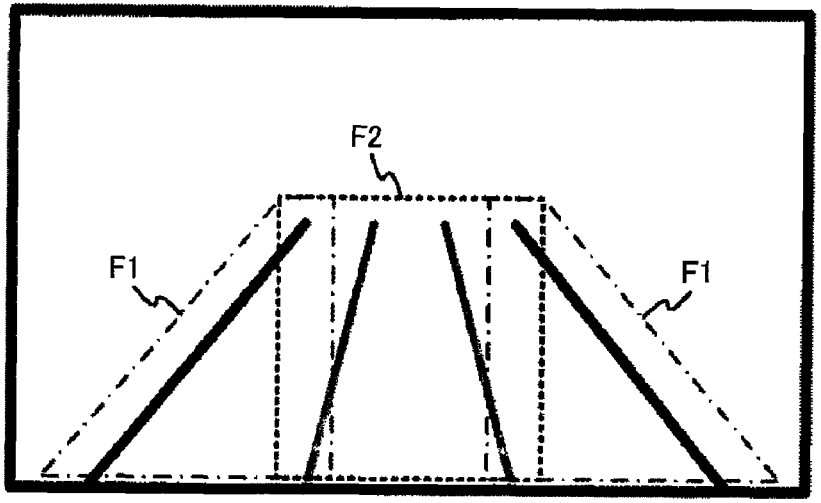
FIG. 8 is a diagram illustrating examples of a virtual camera image in which a first region and a second region are defined in one embodiment of the embodiments.
Figure 8:
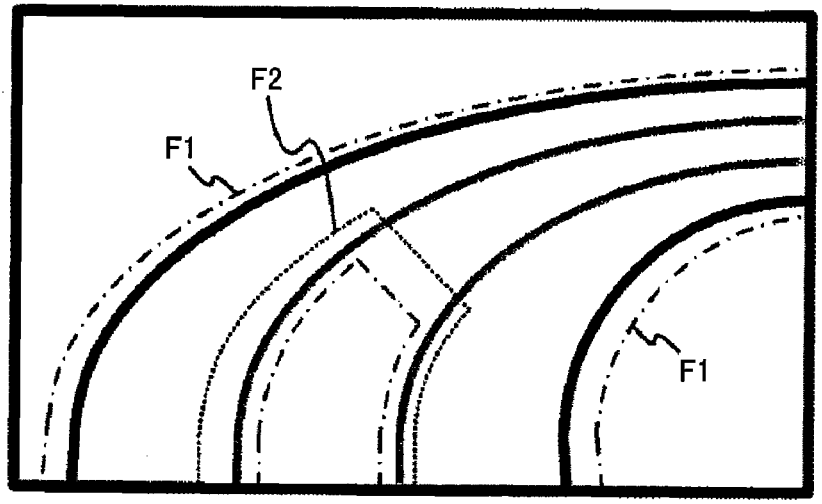

Now, the final first and second regions will be described with reference to FIG. 8.

For example, if the monitor-side vehicle is traveling straight and the rear road is straight, as shown in FIG. 8(a), the right-behind region of the monitor-side vehicle will be a second region F2 in which a further vehicle moves slowly with respect to a background, and the both sides of the region will be a first region F1 in which a monitored vehicle moves fast with respect to a background.

If the monitor-side vehicle is traveling straight or in a curve and the rear road curves, as shown in FIG. 8(b), similarly to the case of FIG. 8(a), the right-behind region of the monitor-side vehicle will be a second region F2, and the both sides of the region will be a first region F1. However, the road curves, and there is, even in the right-behind region of the monitor-side vehicle, also a region in which a further vehicle moves fast with respect to a background. In other words, a region where monitored vehicles laterally move with respect to a traveling direction of the monitor-side vehicle becomes larger. Therefore the second region F2 will be smaller than the second region in FIG. 8(a), and the first region F1 will be larger than the first region in FIG. 8(a).

Now, the approaching vehicle detecting process (S20) will be described in detail according to the flowchart shown in FIG. 4.

The region extracting unit 22 of the image processing device 10 determines whether a predetermined time period ΔT has elapsed from the start of the operation or not, or whether another time period ΔT has elapsed after a preceding elapsed time of time period ΔT or not (S21). A time period ΔT here is same as the time period ΔT of Step 11 in FIG. 3.

The region extracting unit 22, if a time period ΔT has elapsed, obtains an image by the camera 1 (S22). Here, for convenience of description below, an image at time T is assumed to be obtained.

The region extracting unit 22 then obtains information of the first region at time T stored by the region defining process (S10) described above to extract a first region in the camera image obtained at Step 22 described above (S23a).

Then, the first image processing unit 23 divides the first region into a plurality of regions, and in each of the regions, feature portions, such as a feature point or an edge, are extracted (S24a). These feature portions are stored with association with the divided region thereof and the time T (S25a). The first image processing unit 23 then compares feature portions at time T−ΔT, i.e. previously stored feature portions, with feature portions at time T in every divided region (S26a), and determines a presence of an approaching vehicle (S27a).

Figure 9:
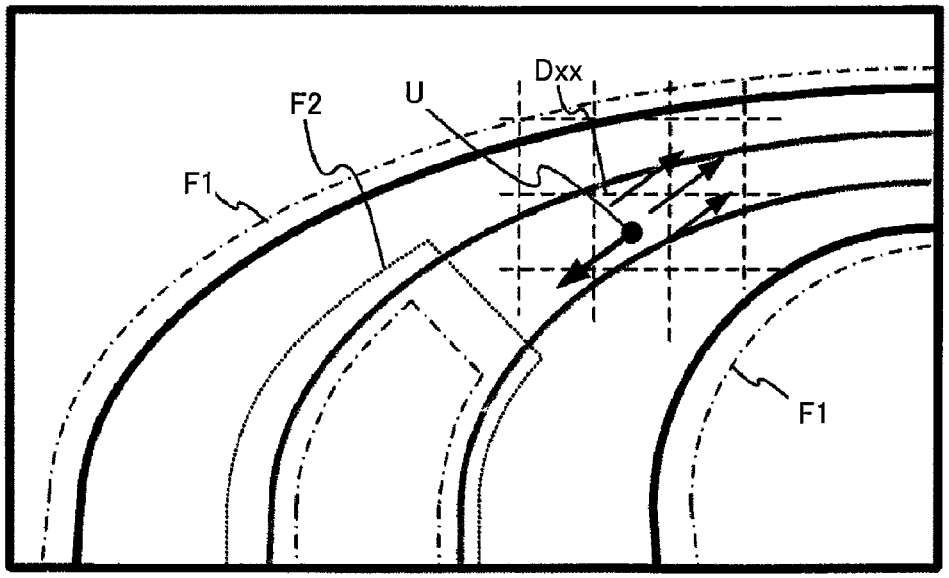
FIG. 9 is a diagram illustrating a method for detecting a presence of an approaching vehicle based on movement of feature portions in one embodiment according to the present invention.

For example, as shown in FIG. 9, if a feature portion U in one divided region Dxx at time T−ΔT is moving toward the monitor-side vehicle at time T and if, on the other hand, surroundings of this feature portion are moving in the opposite direction, "a vehicle approaching" is determined. That is, the first image processing unit 23 here employs a method, typified by the optical flow, for tracking a feature portion to detect movement of the feature portion.

The first image processing unit 23, if no approaching vehicle is determined in Step 27a, immediately returns back to Step 21. If it is determined that a vehicle is approaching in Step 27a, the process outputs a notification of "a vehicle approaching" (S28a), and then returns back to Step 21.

Steps 23b-28b are performed, in parallel with, or before or after, Steps 23a-28a above.

The region extracting unit 22 obtains a camera image at time T (S22), and then obtains the information of the second region at time T stored in the above-described region defining process (S10) and extracts a second region in the camera image obtained in Step 22 (S23b).

Then, the second image processing unit 24 searches in the second region for a shape pattern analogous to any of a plurality of shape patterns stored in the storage device 12 (S24b). If a shape pattern analogous to any of the shape patterns exists, the identifier of the shape pattern, the size of the shape pattern, the position of the shape pattern in the image are stored with association with the time T (S25b). The second image-processing unit 24 then compares the shape pattern at time T−ΔT with the shape pattern at time T (S26b) to determine a presence of an approaching vehicle (S27b).

Figure 10:
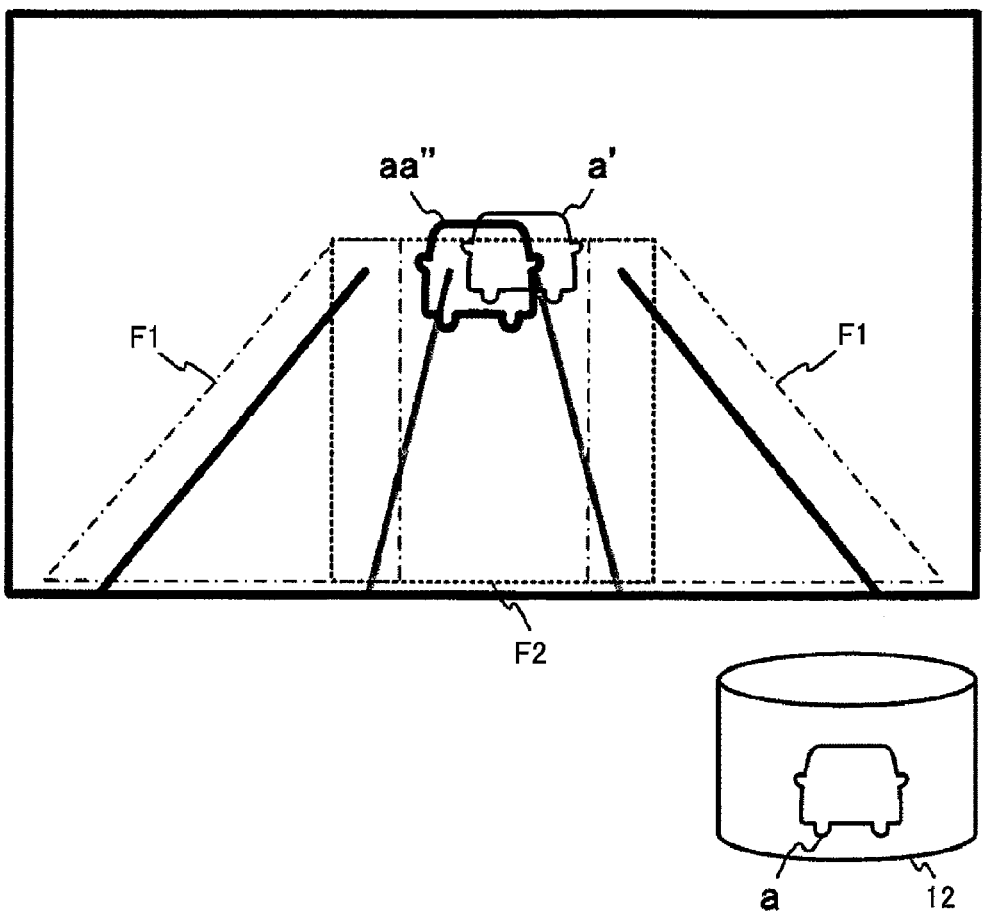
FIG. 10 is a diagram illustrating a method for detecting a presence of an approaching vehicle using pattern recognition in one embodiment according to the present invention.

For example, as shown in FIG. 10, a shape pattern a' analogous to a shape pattern a is assumed to be at a position in the second region at time T−ΔT. If, in the second region at time T, a shape pattern a" analogous to the shape pattern a exists at or close to the position at which the shape pattern a' existed, and if the size of the shape pattern a" is larger than the previous shape pattern a', "a vehicle approaching" is determined. On the other hand, even if, in the second region at time T, a shape pattern a" analogous to the shape pattern a exists, and, in the second region at time T−ΔT at or close to the position at which the shape pattern a" exists, if a shape pattern a' analogous to the shape pattern a does not exist, or if a shape pattern a' analogous to the shape pattern a exists and the size of the shape pattern a' is equal to or larger than the shape pattern a", "no approaching vehicle" is determined.

The second image processing unit 24, if no approaching vehicle is determined in Step 27*b*, immediately returns back to Step 21. If it is determined that a vehicle is approaching in Step 27*b*, the process outputs a notification of "a vehicle approaching" (S28*b*), and then returns back to Step 21.

As described above, partial overlap of a first region F1 and a second region F2 prevents a monitored vehicle on the boundaries between the first region and the second region defined on the actual camera image from failing to be detected by either the image processing unit 23 or 24.

At this step, the approaching vehicle detecting process (S20) will be completed.

When the approaching vehicle detecting process (S20) terminates, as described above, the approaching vehicle determining unit 25 performs the final determining process (S30) for an approaching vehicle. If the process determines that a vehicle is approaching, a notification that a vehicle is approaching is output to the travel control device 4 or the speaker 3.

As described above, according to the embodiment, in an image obtained by the in-vehicle camera 1, a first region F1 in which a monitored vehicle A moves fast with respect to a background, and a second region F2 in which a monitored vehicle A moves slowly with respect to a background are defined. In the first region F1, the monitored vehicle A is detected with movement of feature portions in the region, and in the second region F2, the monitored vehicle A is detected with pattern recognition, thereby minimizing detection failures for the monitored vehicle A.

In addition, according to the embodiment, a presence of an approaching vehicle is finally determined with consideration for a detection result of the monitored vehicle A by the radar device 2, allowing decrease of error detection of an approaching vehicle.

Furthermore, according to the embodiment, only a region corresponding to a road in an image obtained by the in-vehicle camera 1 is subjected to an image processing to detect the monitored vehicle A, allowing reduction of load of the CPU 20 caused by the image processing.

While, according to the embodiment, a presence of an approaching vehicle is detected, the present invention is not limited to this. Simply, a presence of a vehicle in the rear area of the monitor-side vehicle may be detected. In this case, the processes of Step 25*b* and Step 26*b* can be skipped among Steps 24*b*-26*b* in the second image processing unit 24.

In addition, while, according to the embodiment, map information stored in the car navigation device 30 is used to specify a road shape, it is also possible that, before defining a region, an image obtained by the camera 1 is subjected to an image processing to recognize a lane and the shape of the recognized lane may be used as a road shape in the rear area of the monitor-side vehicle. In this case, an image for recognizing a lane is a previous image of an image at the vehicle detection time, and therefore, a portion of the shape of the rear road at the vehicle detection time requires to be corrected. The methods for correcting a portion of the road shape include a method for deriving a portion to be corrected from a vehicle speed or a steering angle of the monitor-side vehicle at the vehicle detection time, and a method for deriving a portion to be corrected from map information.

In addition, while a vehicle according to the embodiment comprises the radar device 2, it should be noted that, without the radar device 2, a presence of an approaching vehicle can be detected. In this case, when "a vehicle approaching" is output from either the first image processing unit 23 or the second image processing unit 24, the output unit 26 immediately outputs the notification to the speaker 3, the travel control device 4 or the like.

Furthermore, while, according to the embodiment, a vehicle in the rear area of the monitor-side vehicle is detected, it should be noted that a camera may be provided toward the forward direction on the front side of the monitor-side vehicle to detect a vehicle in the front of the monitor-side vehicle.

What is claimed is:

1. An image processing device for analyzing an image obtained by an in-vehicle camera in a first vehicle, and detecting the presence of a second vehicle in proximity to the first vehicle, the image processing device comprising:
    a region defining section, wherein there are provided i) a virtual background in a common image that is present at both a vehicle detection time and at an earlier time that precedes the vehicle detection time by a predetermined time-period, and ii) a virtual vehicle moving at a predetermined speed in the common image present at both the vehicle detection time and the earlier time; wherein a difference is obtained between movement of the virtual background from the earlier time to the vehicle detection time, and movement of the virtual vehicle from the earlier time to the vehicle detection time; and wherein the region defining section defines for the image at the vehicle detection time a first region for which the difference is equal to or larger than a predetermined value, and a second region for which the difference is less than the predetermined value;
    a first image processing section which detects the presence of a vehicle from movement of a common feature portion that is present in both the first region of an actual image obtained at the vehicle detection time and a corresponding region in an actual image obtained at the earlier time;
    a second image processing section which detects the presence of a vehicle according to whether a shape pattern analogous to any of a plurality of previously stored shape patterns exists in the second region in the actual image at the vehicle detection time; and
    an output section which outputs a warning notification that the second vehicle exists in proximity to the first vehicle, based on the detection results of the first image processing section and the second image processing section,
    wherein the region defining section:
    obtains a position of the first vehicle and map information around the first vehicle from a car navigation device, and derives, from the position of the first vehicle and the map information, the shape of a road on which the first vehicle is traveling; or
    derives the shape of the road on which the first vehicle is traveling from the image obtained by the in-vehicle camera before the region defining section defines the first region and the second region in the image at the vehicle detection time; and
    applies the road with the derived shape to the common image at the earlier time and the vehicle detection time, and defines the virtual background and the virtual vehicle in the road with the derived shape.

2. The image processing device according to claim claim 1, wherein:

the region defining section assumes a vehicle traveling on the road with the derived shape as the virtual vehicle.

3. The image processing device according to claim 1, wherein the region defining section:
  assumes a vehicle moving toward the first vehicle as the virtual vehicle;
  obtains a vehicle speed of the first vehicle;
  defines a speed faster than the vehicle speed of the first vehicle as the predetermined speed of the virtual vehicle if the camera images a rear area of the first vehicle, and defines a speed slower than the vehicle speed of the first vehicle as the predetermined speed of the virtual vehicle if the camera images a front area of the first vehicle.

4. The image processing device according to claim 1, wherein:
  the first region in the image at the vehicle detection time includes a portion of the first region side in the second region; and
  the second region in the image at the vehicle detection time includes a region portion of the second region side in the first region; and
  the first portion and the second portion overlap by a predetermined width in the image.

5. The image processing device according to claim 1, wherein:
  the first image processing section detects the presence of an approaching vehicle from a movement pattern of a feature portion with respect to surroundings of the feature portion.

6. The image processing device according to claim 1, wherein:
  if a shape pattern analogous to any of a plurality of previously stored shape patterns exists in the second region of the image obtained by the in-vehicle camera at the vehicle detection time, the second image processing section stores the shape pattern and the size of the shape pattern; and
  if the shape pattern is stored before the vehicle detection time and if the size of the shape pattern at the vehicle detection time is larger than the size of the shape pattern stored before the vehicle detection time, the second image processing section determines that a vehicle is approaching.

7. The image processing device according to claim 1, wherein:
  if i) a notification that the second vehicle exists in proximity to the first vehicle is received from a radar device which irradiates the surroundings of the first vehicle with radar and analyzes a reflected wave of the radar to detect the presence of the second vehicle that is in proximity to the first vehicle, and ii) the first image processing section or the second image processing section also detects the presence of the second vehicle in proximity to the first vehicle,
  then the output section outputs the warning notification.

8. A vehicle detection device, comprising:
  the image processing device according to claim 1; and
  a camera.

* * * * *